United States Patent
Lunde et al.

(10) Patent No.: US 7,802,623 B2
(45) Date of Patent: Sep. 28, 2010

(54) METHOD AND A DEVICE FOR DESTRUCTION OF ORGANIC MATERIAL IN INJECTION WATER

(75) Inventors: Helge Lunde, Sandnes (NO); David Pinchin, Hundvåg (NO)

(73) Assignee: Well Processing AS (NO)

( * ) Notice: Subject to any disclaimer, the term of this patent is extended or adjusted under 35 U.S.C. 154(b) by 192 days.

(21) Appl. No.: 12/158,602

(22) PCT Filed: Dec. 11, 2006

(86) PCT No.: PCT/NO2006/000475

§ 371 (c)(1),
(2), (4) Date: Jun. 20, 2008

(87) PCT Pub. No.: WO2007/073198

PCT Pub. Date: Jun. 28, 2007

(65) Prior Publication Data

US 2009/0301717 A1 Dec. 10, 2009

(30) Foreign Application Priority Data

Dec. 23, 2005 (NO) .................................. 20056166

(51) Int. Cl.
*E21B 43/20* (2006.01)
*C02F 1/46* (2006.01)
(52) U.S. Cl. ................ 166/305.1; 166/65.1; 166/75.11; 166/90.1; 166/268; 210/243; 210/747; 507/905
(58) Field of Classification Search ........................ None
See application file for complete search history.

(56) References Cited

U.S. PATENT DOCUMENTS 2,801,697 A * 8/1957 Rohrback ................. 166/244.1

(Continued)

FOREIGN PATENT DOCUMENTS

EP 1505038 A2 2/2005

(Continued)

OTHER PUBLICATIONS

Terdre, N. "Oxidation Technique Eliminates Bacteria in Industrial/Potable Water Treatment Systems", Offshore Magazine, vol. 64, Issue 10, Oct. 2004.

*Primary Examiner*—George Suchfield
(74) *Attorney, Agent, or Firm*—Akerman Senterfitt (57) ABSTRACT

A method and a device (2) for destruction of organic material in injection water for an injection well (4), in which a means (10) for introduction of water in the injection well (4), and at least one electrochemical cell (16) with associated operating means are used for in situ electrolytic generation from water of at least short-lived, free hydroxyl radicals. The distinctive characteristic of the invention is that it comprises the following steps: (A) to connect the at least one electrochemical cell (16) to the injection well (4); and (B) by means of said operating means, to conduct the injection water through said cell (16) for in situ generation of at least free hydroxyl radicals from the injection water, insofar as free hydroxyl radicals immediately destruct organic material that they engage in the injection water. The invention also comprises use of water, which is to be injected into an injection well (4), as a source material for in situ electrolytic generation of said hydroxyl radicals for immediately destruction of organic material in the injection water.

17 Claims, 3 Drawing Sheets

U.S. PATENT DOCUMENTS

| | | | |
|---|---|---|---|
| 3,049,492 A * | 8/1962 | De Groote et al. | 166/275 |
| 3,724,543 A * | 4/1973 | Bell et al. | 166/248 |
| 3,782,465 A * | 1/1974 | Bell et al. | 166/248 |
| 4,273,189 A * | 6/1981 | Carpenter | 166/266 |
| 6,183,646 B1 | 2/2001 | Williams et al. | |
| 6,265,205 B1 * | 7/2001 | Hitchens et al. | 435/262 |
| 6,268,205 B1 * | 7/2001 | Kiest et al. | 435/262.5 |
| 6,375,827 B1 | 4/2002 | Kurosu et al. | |
| 6,770,192 B2 * | 8/2004 | Peterson | 210/149 |
| 2003/0089651 A1 | 5/2003 | Peterson | |
| 2004/0026335 A1 * | 2/2004 | Fields | 210/748 |
| 2008/0115930 A1 * | 5/2008 | Peters et al. | 166/248 |

FOREIGN PATENT DOCUMENTS

| | | |
|---|---|---|
| JP | 2005-193202 A | 7/2005 |
| WO | 2004/090284 A1 | 10/2004 |

\* cited by examiner

METHOD AND A DEVICE FOR DESTRUCTION OF ORGANIC MATERIAL IN INJECTION WATER

AREA OF INVENTION

The invention concerns a method and a device for destruction of organic material in water to be injected into an injection well. Preferably, the water is injected in connection with petroleum recovery of petroleum reserves.

Any suitable type of water from any suitable source may be used as injection water. The injection water may thus consist of, for example, saline seawater, freshwater or so-called produced water from a separation plant connected to a production well.

The injection well may be an onshore well or a subsea well. Such a subsea well may be connected to a surface installation, for example a platform or a vessel, or it may be completed at the bottom of a body of water, such as in the sea; in a lake or in a delta region.

BACKGROUND OF THE INVENTION

A common secondary recovery method for increasing the production rate of a petroleum reservoir and the recoverable petroleum reserves is to inject water into the reservoir. The injection water is conducted into the reservoir at a pressure that drives out further hydrocarbons therefrom.

Due to various reasons, the injection water normally must be treated with chemicals prior to being injected into the reservoir. Water for injection is generally taken from the closest available water source, for example saline seawater, and normally there will be various organic and inorganic materials present in the water. The organic material comprises, among others, zooplankton, phytoplankton, bacteria and similar.

Organic material in the injection water may bring about unfavorable conditions and results downstream of the inlet point of the water. This may occur in the form of biofouling, sedimentation and/or scaling taking place on equipment located upstream of the well, within the well and downstream thereof. For example, such equipment may include sulphate treatment equipment for removing sulphates ($SO_4$) from the injection water.

Such organic material in the injection water may also carry, among others, anaerobic, sulphate-reducing bacteria. When, for example, seawater is injected into a hydrocarbon-containing reservoir, substantial amounts of said sulphates along with carbon compounds are introduced into the reservoir. Thus, the anaerobic, sulphate-reducing bacteria are given excellent conditions for generating hydrogen sulphide ($H_2S$), which may cause reservoir souring, among other things. Hydrogen sulphide gas is also very corrosive and may have a very destructive effect on well-related equipment. The gas is also toxic and may be injurious to health and may be directly life-threatening if, in this connection, coming into contact with living creatures.

Oftentimes the efficient destruction of organic material, particularly bacteria, in the injection water is therefore a prerequisite for allowing water injection to take place in a subsurface reservoir. The water treatment would be even more efficient if also the nutritive organisms and substances for the bacteria were destructed in so doing. After the treatment, the water would thus lack nutrients for any surviving bacteria.

Failure in the destruction of organic material, however, may result in reservoir souring, corrosion problems and gradual build-up of bacteria slime and various deposits and similar in the reservoir and in the well.

PRIOR ART AND DISADVANTAGES THEREOF

In order to destruct harmful organic material in water to be injected, various chemicals, equipment and methods are used for this purpose.

Normally, the chemicals are supplied from a suitable installation at the surface, and the chemicals are usually in liquid state. Chlorine and biocide are examples of such organism-killing and organism-growth-inhibiting chemicals. Simultaneously, but for other reasons, other types of chemicals may also be supplied, including oxygen scavengers, corrosion inhibitors and scale inhibitors.

U.S. Pat. No. 6,183,646 B1 concerns surface-based treatment of water, for example seawater, with respect to reducing or preventing biofouling of equipment or plants, including water injection equipment and desalination plants, which make use of the water.

However, U.S. Pat. No. 316,918 B1, which corresponds to WO 2004/090284, discloses a method and an apparatus for subsea chemical treatment of injection water, in which a module-based subsea apparatus connected to an injection well, is used for injection of the water. The apparatus contains at least one receptacle provided with at least one type of water-soluble solid-state chemical. For example, the receptacle may be replaced by means of a remotely operated vehicle ("ROV"). The water is then brought into contact with the solid-state chemical, so as to allow it to gradually dissolve and mix with the water. Subsequently, the treated water is injected into a reservoir connected to the well. Chemical treatment and water injection may thus be carried out without having to use an immediately overlying surface installation or surface vessel. The water-soluble solid-state chemical may comprise chlorine and/or biocide, but also various other chemicals, such as said oxygen scavengers, corrosion inhibitors and scale inhibitors.

So-called electro-chlorination (with or without copper-ion dosing) and/or UV-sterilization may be used, as an alternative or addition, to kill and/or to inhibit organism-growth and similar in the water to be injected. These methods may be carried out on a surface installation, but they may also be used in, connection with the method and the subsea apparatus according to U.S. Pat. No. 316,918 B1.

Electro-chlorination makes use of a high-voltage unit, a so-called "cell", for electrolytic conversion of seawater to a sodium-hypochlorite solution and hydrogen. The hydrogen is vented off, whereas the hypochlorite solution is added to the injection water in order to kill and/or to inhibit growth of various organisms therein. In another variant, a sacrificial copper anode is used in combination with low-grade dosing of chlorine, after which a mixture containing copper-ions and hypochlorite is added to the injection water.

Said prior art, however, is associated with a number of disadvantages and unfortunate and/or harmful effects of various types. This may involve environmental side effects due to use of, for example, chlorine, copper compounds and/or biocide, insofar as such chemicals still will be present in the injection water subsequent to having carried out their primary task of killing bacteria in the water. Thus, the chemicals will be conveyed onwards in the injection flow and, into the reservoir, among other things. This may bring about unfortunate side effects in downstream regions coming into contact with the injection water. Moreover, use of biocide may have a destructive effect on various membranes in well-related filtering equipment.

The prior art technology may also involve cost-related and/or technical disadvantages. As such, much of the prior art will exhibit insufficient technical function, possibly poor technical efficiency and/or an unacceptable technical extent in certain situations. This is particularly true when using a surface-based installation for supplying liquid chemicals for treatment of the injection water, and especially when such treatment is carried out offshore. The latter water injection operation is very costly and is therefore most suitable in connection with large reservoir occurrences.

Most of the prior art available for killing and/or inhibiting organism-growth in injection water is therefore not very suitable in connection with marginal hydrocarbon occurrences. One exception from this, however, is the above-mentioned prior art according to U.S. Pat. No. 316,918 B1 and WO 2004/090284. Innovations in this technical area may therefore open for profitable recovery of marginal hydrocarbon reservoirs. Such innovations may also increase the recovery factor and the profitability of existing production facilities located both onshore and offshore.

In principle, it would therefore be very favourable favorable if destruction of organic material in the injection water could be carried out in a manner avoiding the above-mentioned problems and disadvantages of the prior art, including avoiding the use of environmentally hazardous chlorine, copper compounds and/or biocide.

OBJECTS OF THE INVENTION

The primary object of the invention is to avoid or reduce the above-mentioned disadvantages of the prior art.

A more specific object is to provide a technical innovation that is capable of destructing, in a simple, inexpensive, efficient and environmentally friendly manner, organic material in water to be injected into a subsurface formation via an injection well.

A further object is to provide such a technical innovation that is capable of being used both above and under water in connection with such water injection.

Yet further, it is an object to provide such a technical innovation that is capable of being used together with other types of water treatment equipment for other types of treatment of such injection water.

How the Objects are Achieved

The objects are achieved by means of the features disclosed in the following description and in the subsequent claims.

The present invention presupposes, among other things, use of prior art well-related technology, including equipment, means and methods, to assist the present treatment and injection of water in a subsurface formation, insofar as the formation preferably is a hydrocarbon-containing reservoir.

Depending on the actual need, said well-related technology may comprise various known equipment, such as:
  constructional elements, including pipes;
  connection conduits;
  couplings;
  valves;
  protective structures;
  pumping equipment, including water lift pumps, low-pressure booster pumps, high-pressure injection pumps and feed pumps;
  water filtering equipment, including various filters and/or grates for separating particles of solids and/or larger organisms from untreated raw water if taken from a nearby body of water, for example from the sea around a surface installation;
  water de-aeration equipment;
  various operating means and operating equipment;
  monitoring means;
  control means, including regulating equipment and measuring equipment; and
  various other auxiliary means and equipment associated with the above-mentioned equipment.

For the execution of the invention, various underwater technology and equipment may also be used, such as unmanned underwater vehicles ("ROV") and ROV-based equipment.

The choices and adaptations of the above-mentioned and related equipment lie within the area of the person skilled in the art and hence will not be discussed in further detail in the subsequent description of the invention.

According to a first aspect of the invention, a method is provided for destruction of organic material in injection water for an injection well, said method making use of:
  a means for introduction of water in the injection well; and
  at least one electrochemical cell with associated operating means for in situ electrolytic generation, via radiolysis of water, of at least one reactive oxygen compound; said method comprising:
    (A) connecting the at least one electrochemical cell to the injection well;
    (B) conducting said injection water, by means of said operating means, through the electrochemical cell for in situ generation of said at least one reactive oxygen compound species, thereby using the injection water as a source material for said radiolysis; and
    (C) arranging said electrochemical cell for in situ generation of short-lived, free hydroxyl radicals as at least a primary agent resulting from said radiolysis of the injection water, said hydroxyl radicals being a reactive oxygen compound species that will immediately destruct organic material engaged in the injection water.

Said means for introduction of water in the injection well may consist of water injection pumping equipment, for a high-pressure injection pump. The means may also comprise introduction of water in a subsurface formation due to a relative underpressure therein as compared to the pressure of the water, the condition of which may occur, for example, in a partially depleted reservoir.

The method may also comprise a step of choosing the injection water from at least one of the following types of water:
  saline water;
  freshwater; and
  produced water from a fluid flow from a production well.

Through use of suitable operating means and appropriate regulation of voltage and amperage across electrodes of said electrochemical cell, at least free hydroxyl radicals may be generated in situ from the specific raw water conducted into the cell. For example, so-called diamond electrodes, which comprise an electrode substrate consisting of niobium (Nb) and being coated with diamonds, may be used in this connection. The construction of the cell, the operating means and the manner of operation, however, is considered as prior art and hence will not be discussed in further detail. It is also physically possible to arrange such a cell and its operating means with small physical dimensions and still maintain a large water treatment capacity, thereby rendering possible to handle flow rates of up to several hundred $m^3$/hour. These facts therefore make this technology very suitable for use in connection with subsurface water injection.

Said hydroxyl radical (.OH) exists as a chemical species in nature, and for one as a photochemical oxidant in the atmosphere. Other photochemical oxidants in the atmosphere include ozone ($O_3$) and hydrogen peroxide ($H_2O_2$) and peroxyacetylnitrate (PAN). The hydroxyl radical represents the atmosphere's most powerful oxidant with respect to pollutants in atmospheric air. The hydroxyl radical thus contribute to cleanse the air and is oftentimes referred to as nature's detergent or cleansing agent. This radical is 20 times more efficient than ozone with respect to oxidizing atmospheric pollutants. The hydroxyl radical is also 2.5 times more bactericidal and fungicidal than chlorine.

The hydroxyl radical falls within the so-called free radicals, chemically speaking. In general, a free radical consists of an atomic group comprising at least two dissimilar elements capable of reacting with other atoms or atomic groups. Several types of free radicals exist. A characterizing feature of a radical is that it possesses an unpaired electron in its outer or outermost electron shell. This represents an extremely unstable configuration of electrons, and the radical will therefore react very fast with other molecules or radicals in order to obtain a stabile electron pair configuration in the outermost electron shell. This unstableness makes a radical highly oxidizing, and it may therefore react very fast and aggressively with most molecules in its vicinity. Such molecules include proteins, lipids, carbohydrates, DNA and similar, and these chemical compounds form main constituents in cells and cell structures of organic material. Free radicals are especially aggressive on fatty acid side chains of lipids in various types of cell membranes.

Another peculiarity of a free radical is that, upon reacting with another molecule to gain a stable configuration of electrons, it converts the other molecule into a new radical. This initiates a chain reaction of radical formation in the organic material exposed to such radicals, and this chain reaction will quickly damage, possibly destroy, the organic material. As such, free radicals represent very dangerous compounds to organic material, which includes, among others, zooplankton, phytoplankton and bacteria.

The most reactive of all free radicals is the above-mentioned hydroxyl radical (.OH), which an electrically neutral form of the negatively charged hydroxide-ion ($OH^-$). Due to its extreme reactivity, the hydroxyl radical is very short-lived and exhibits a half-life period in the order of nanoseconds ($10^{-9}$ second). The hydroxyl radical will therefore react immediately with any oxidizable compound located in its vicinity.

Another very reactive compound is superoxide ($.O_2^-$), which is both an ion and a radical. Hydrogen peroxide ($H_2O_2$) is also an efficient agent for killing and/or inhibiting growth of organisms, especially bacteria.

However, with respect to destruction of organic material, including cell constituents, the hydroxyl radical is several orders of magnitude more reactive than the superoxide radical and, further, several orders of magnitude more reactive than the hydrogen peroxide molecule.

The hydroxyl radical may also be made artificially, for example in a test tube, via a so-called Fenton-reaction or a Haber-Weiss-reaction. These reactions are known within this area of the art.

Moreover, the hydroxyl radical .OH is formed artificially through radiolysis of water. This is the method used in the present invention, the method of which is very suitable for destruction of organic material, including microorganisms, in injection water to be injected into a subsurface formation. Among other things, this has to do with the fact that hydroxyl radicals have an extremely short lifetime and thus carry out their extremely short and highly destructive mission in situ in said electrochemical cell. Thereby, the discharging water will not contain hydroxyl radicals capable of inflicting harmful effects downstream of the cell. Another appreciable advantage of such in situ electrolytic generation of hydroxyl radicals, is that the primary reaction products from the cell's electrolysis process is carbon dioxide ($CO_2$) and water ($H_2O$), which are non-toxic and do not cause any harmful effects downstream in the injection stream. Accordingly, the present invention is most environmentally friendly.

If saline seawater is used as raw material for the cell's electrolysis process, chlorine (Cl) and hypochlorite ($OCl^-$) may occur as by-products. However, these by-products will occur in minor amounts and will thus have a harmless, disinfecting effect in the injection water relative to the unfavorable and/or harmful effects possible due to extensive treatment of chlorine and chlorine-containing chemicals, among others, in certain situations.

In addition to primary generation of said hydroxyl radicals, and if desirable and/or required, the method may comprise a step of also arranging the cell for generation of at least one other of the following reactive oxygen compounds:

ozone;
hydrogen peroxide;
hypochlorite; and
superoxide.

Such reactive oxygen compounds will also be able to destruct organic material in the injection water when mixed therewith. Generation of these compounds, among others, may also be achieved through appropriate regulation of voltage and amperage across the electrodes of the cell.

According to a preferred embodiment, the method may comprise a step of providing said at least one electrochemical cell upstream of the injection well, for example at the surface or under water.

In this manner the cell may be provided on a surface installation or onshore or offshore. For example, the surface installation may appear as a bottom-fixed or floating structure connected to the well, for example a platform or a suitable vessel. The cell may also be provided under water, for example in connection with a seabed-completed injection well. As such, the well and the cell may be connected to a nearby or remote host installation for operation and control thereof.

The host installation may be comprised of a nearby or remote installation onshore, for example a plant.

Offshore the host installation may be comprised of a nearby or remote surface installation, for example a platform, or a suitable surface vessel, for example a production ship or similar. Offshore the host installation may also be comprised of a nearby or remote subsea structure, for example an operation- and control arrangement placed on the seabed.

For example, the connection between the host installation and the injection well and the associated electrochemical cell may be established via a so-called umbilical.

If the injection well is connected to sulphate treatment equipment for removing sulphates from the injection water, the method may comprise a step of providing at least one electrochemical cell may be provided upstream of said sulphate treatment equipment. Bacteria, which are capable of fouling said sulphate treatment equipment, are thus destructed upstream of the sulphate treatment equipment and prior to water being injected into the well.

According to the method, providing one or more electrochemical cells in at least one module may be appropriate, especially offshore. Such a module may take form of a suitable storage unit and/or protective structure, for example a cabinet, a cage, a container, a foundation and/or a frame.

Conducting treated injection water via at least one intermediate storage receptacle for temporary storage of the injection water prior to injection in the well may also be appropriate. This may be required in order to ensure a steady injection rate into the well.

Conducting treated injection water in loop via at least one electrochemical cell may also be an alternative or addition, whereby the injection water is re-treated. This may be appropriate if the raw water contains a lot of and/or very hazardous organic material requiring destruction thereof.

In addition to the above-mentioned steps, the method may comprise a step of conducting the injection water to at least one piece of auxiliary equipment for further treatment of the water. This may prove particularly advantageous if the water must be treated with respect to various other unfortunate conditions that may occur in a well.

Advantageously, the present invention may thus be used together with the above-mentioned method and apparatus according to U.S. Pat. No. 316,918 B1 and WO 2004/090284. Insofar as said hydroxyl radicals see to the destruction of organic material in the injection water, considerably smaller amounts of water-soluble solid-state chemical(s) are required for this purpose at a given flow rate of water throughput. Thereby, the consumption of solid-state chemical(s) as well as the replacement frequency of the holding receptacle is reduced. This brings about appreciable operational, cost-related and environmental advantages.

Said auxiliary equipment may thus include chemical treatment equipment for treating the injection water with at least one of the following generic types of chemicals:
- chlorine;
- poly-electrolytes;
- iron chloride;
- oxygen scavenger;
- corrosion inhibitor;
- scale inhibitor; and
- biocide.

It may also prove appropriate to include UV-sterilization equipment in said auxiliary equipment.

Depending on the particular situation, said auxiliary equipment may be placed above or under water.

Providing at least one of said sulphate treatment equipment and said auxiliary equipment in a joint water treatment apparatus may also be included. This may prove especially useful in connection with offshore installations, which to a large extent employ module-based technical solutions. Also this water treatment apparatus may be placed above water or under water, depending on the particular situation.

In a further embodiment the present method may comprise a step of providing said at least one electrochemical cell as downhole equipment in the injection well. As mentioned, this follows from the fact that it is physically possible to arrange such a cell with small physical dimensions, thereby rendering possible to arrange one or more such cells for installation inside the well.

The latter embodiment may also comprise a step of conducting treated injection water in loop via at least one electrochemical cell, whereby the injection water is re-treated.

In so doing, the method may comprise a step of conducting the injection water to at least one piece of auxiliary equipment for further treatment of the water.

This auxiliary equipment may include chemical treatment equipment for treating the injection water with at least one of the following generic types of chemicals:
- chlorine;
- poly-electrolytes;
- iron chloride;
- oxygen scavenger;
- corrosion inhibitor;
- scale inhibitor; and
- biocide.

As an alternative or addition, the auxiliary equipment may also include UV-sterilization equipment.

Said auxiliary equipment may be placed above water or under water, depending on the particular situation.

According to a second aspect of the invention, a device is provided, the constructive features of which substantially correspond to the above-mentioned method features. The above-mentioned comments to the method also apply to the present device. Said device is provided for destruction of organic material in injection water for an injection well, the device comprising:
- a means for introduction of water into the injection well; and
- at least one electrochemical cell with associated operating means for in situ electrolytic generation, via radiolysis of water, of at least one reactive oxygen compound;
- wherein the at least one electrochemical cell is connected to the injection well;
- wherein the electrochemical cell, by means of said operating means, is arranged in a manner allowing said injection water to be conducted through the cell for in situ generation of said at least one reactive oxygen compound species, thereby using the injection water as a source material for said radiolysis; and
- wherein said electrochemical cell is arranged for in situ generation of short-lived, free hydroxyl radicals as at least a primary agent resulting from said radiolysis of the injection water, said hydroxyl radicals being a reactive oxygen compound species that will immediately destruct organic material engaged in the injection water.

The injection water may comprise at least one of the following types of water:
- saline water;
- freshwater; and
- produced water from a fluid flow from a production well.

In addition to generation of said hydroxyl radicals, the cell may also be arranged for generation of at least one other of the following reactive oxygen compounds:
- ozone;
- hydrogen peroxide;
- hypochlorite; and
- superoxide;

the compounds of which also will be able to destruct organic material in the injection water.

According to a preferred embodiment of the device, said at least one electrochemical cell may be provided upstream of the injection well, for example at the surface or under water.

If the injection well is connected to sulphate treatment equipment for removing sulphates from the injection water, at least one electrochemical cell may be provided upstream of a sulphate treatment equipment for removing sulphates from the injection water. Bacteria, which are capable of fouling said sulphate treatment equipment, are thus destructed upstream of the sulphate treatment equipment and prior to water injection in the well.

One or more electrochemical cells may also be provided in at least one module.

Moreover, the device may comprise at least one intermediate storage receptacle into which treated injection water is conducted for temporary storage prior to injection in the well.

As an alternative or addition, the device may comprise at least one loop through which treated injection water is conducted via at least one electrochemical cell so as to become re-treated.

In addition, the device may comprise a conduit for conducting the injection water to at least one piece of auxiliary equipment for further treatment of the water.

Said auxiliary equipment may thus include chemical treatment equipment for treating the injection water with at least one of the following generic types of chemicals:
chlorine;
poly-electrolytes;
iron chloride;
oxygen scavenger;
corrosion inhibitor;
scale inhibitor; and
biocide.

Said auxiliary equipment may also include UV-sterilization equipment.

Furthermore, at least one of said sulphate treatment equipment and auxiliary equipment may be provided in a joint water treatment apparatus.

In a further embodiment of the present device, said at least one electrochemical cell may be provided as downhole equipment within the injection well.

In the latter embodiment, the device may comprise at least one loop through which treated injection water is conducted via at least one electrochemical cell so as to become re-treated.

In this connection, the device may comprise a conduit for conducting the injection water to at least one piece of auxiliary equipment for further treatment of the water.

This auxiliary equipment may include chemical treatment equipment for treating the injection water with at least one of the following generic types of chemicals:
chlorine;
poly-electrolytes;
iron chloride;
oxygen scavenger;
corrosion inhibitor;
scale inhibitor; and
biocide.

As an alternative or addition, the auxiliary equipment may include UV-sterilization equipment.

As such, the present invention makes use of water, which is to be injected in an injection well, as a source material for in situ elecrolytic generation, via radiolysis of said water, of free hydroxyl radicals as at least a primary agent resulting from said radiolysis of the injection water. Thereby, said hydroxyl radicals will immediately destruct organic material engaged in the injection water prior to being injected into the well.

SHORT DESCRIPTION OF THE DRAWINGS

The following shows some non-restricting examples of embodiments and associated figures of the present invention, in which.

The figures only show main equipment of the device, the equipment of which is very distorted with respect to relative dimensions, and the equipment is depicted in a very simplified shape and richness of detail.

DESCRIPTION OF EXAMPLES OF EMBODIMENTS OF THE INVENTION

Figure 1:
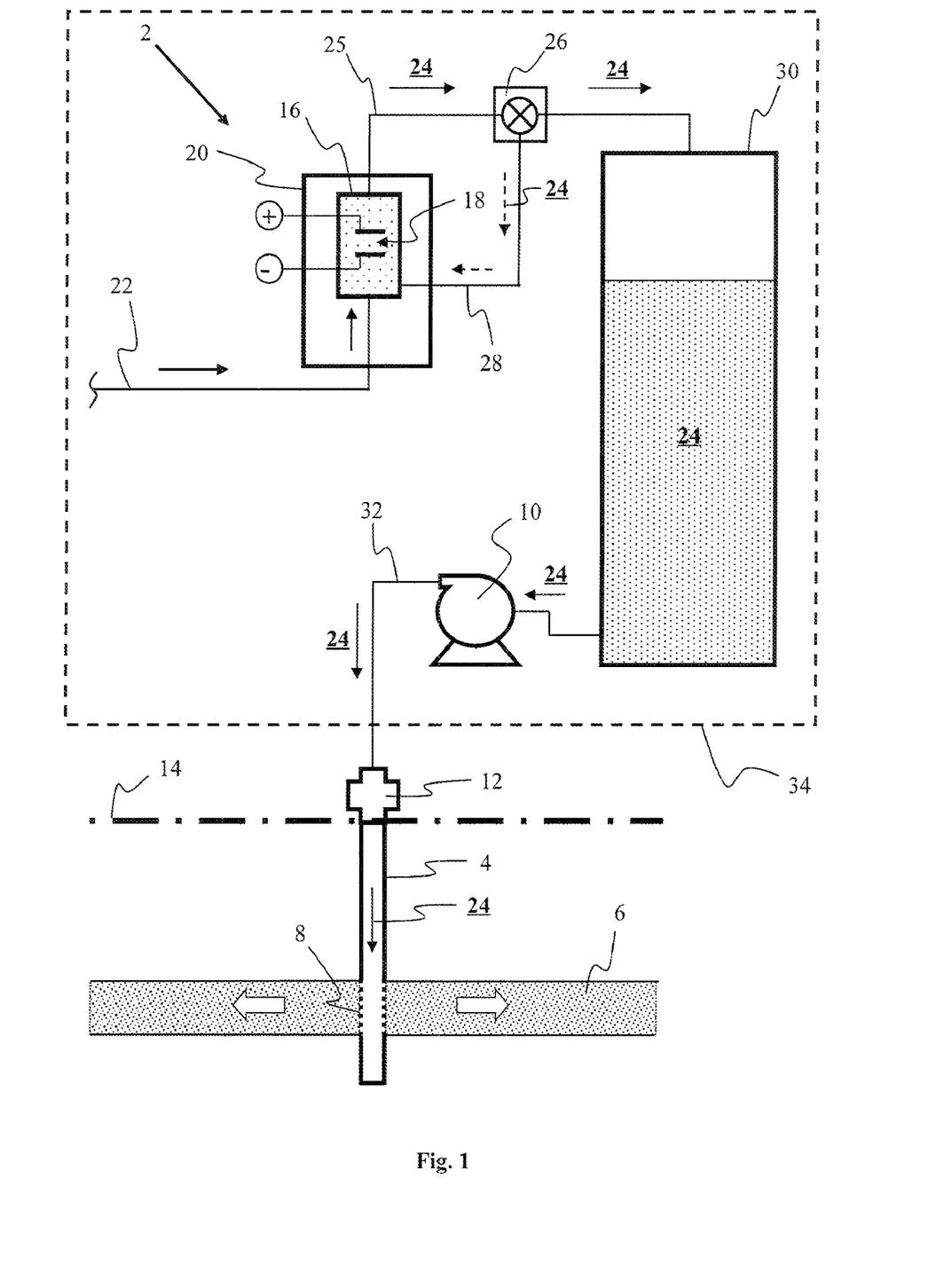
FIG. 1 schematically shows a first example of a device according to the invention, in which the device comprises, among other things, a loop and an intermediate storage receptacle.

FIG. 1 shows a first example of an embodiment of a device 2 for destruction of organic material in injection water for an injection well 4. The well 4 extends down into the subsurface and through a reservoir 6. Treated injection water is pumped into the reservoir via perforations 8 in the wall of the well, whereupon the water spreads out within the reservoir 6, as indicated with wide, white arrows in FIG. 1. Among other things, the device 2 comprises a high-pressure injection pump 10 connected to a wellhead 12 of the injection well 4, the pump of which is used to pump the injection water down into the well 4 and further into the reservoir 6. The Wellhead 12 is placed at an interface 14 (depicted with a dash dot line in the figure), which may be located at the surface or under water, for example at a seabed.

The device 2 also comprises an electrochemical cell 16 provided upstream of the injection well 4 and its wellhead 12. The cell 16 is arranged for in situ electrolytic generation of short-lived, free hydroxyl radicals from injection water conducted into the cell 16. The hydroxyl radicals will immediately destruct organic material that they engage in the injection water. Electrodes 18 of the cell 16 are connected to a voltage-adjustable power supply, which is indicated with its respective poles (+ and −) in the figure, and also other required operating means (not shown). The cell 16 and its operating means are provided in a joint module 20.

Raw water, which later is to be injected in the well 4, is conducted into the module 20 and its electrochemical cell 16 via a supply conduit 22. The flow direction of the water is depicted with black arrows in the figure. Treated injection water 24 is then conducted out of the cell 16 and its module 20 via a discharge conduit 25 and further onward to a control valve 26. In this example of an embodiment, the device 2 also comprises a loop 28 extending from the control valve 26 and back to the electrochemical cell 16. Upon employing appropriate control of the control valve 26, the treated injection water 24 may be conducted through the loop 28 and back to the cell 16 so as to be re-treated with said destructive hydroxyl radicals. The latter optional course of loop-flow is depicted with dashed lines in the figure.

The device 2 also comprises an intermediate storage receptacle 30. Upon completion of the treatment, the injection water 24 is conducted onwards via the control valve 26 and to the intermediate storage receptacle 30 for temporary storage of the injection water 24 prior to being pumped down into the well 4. The use of such an intermediate storage receptacle 30 ensures a steady injection rate into the well 4. The upstream side of said high-pressure injection pump 10 is connected to the intermediate storage receptacle 30, whereas the downstream side of the pump 10 is connected to a high-pressure conduit 32, which is connected to the wellhead 12 of the injection well 4.

Figure 2:
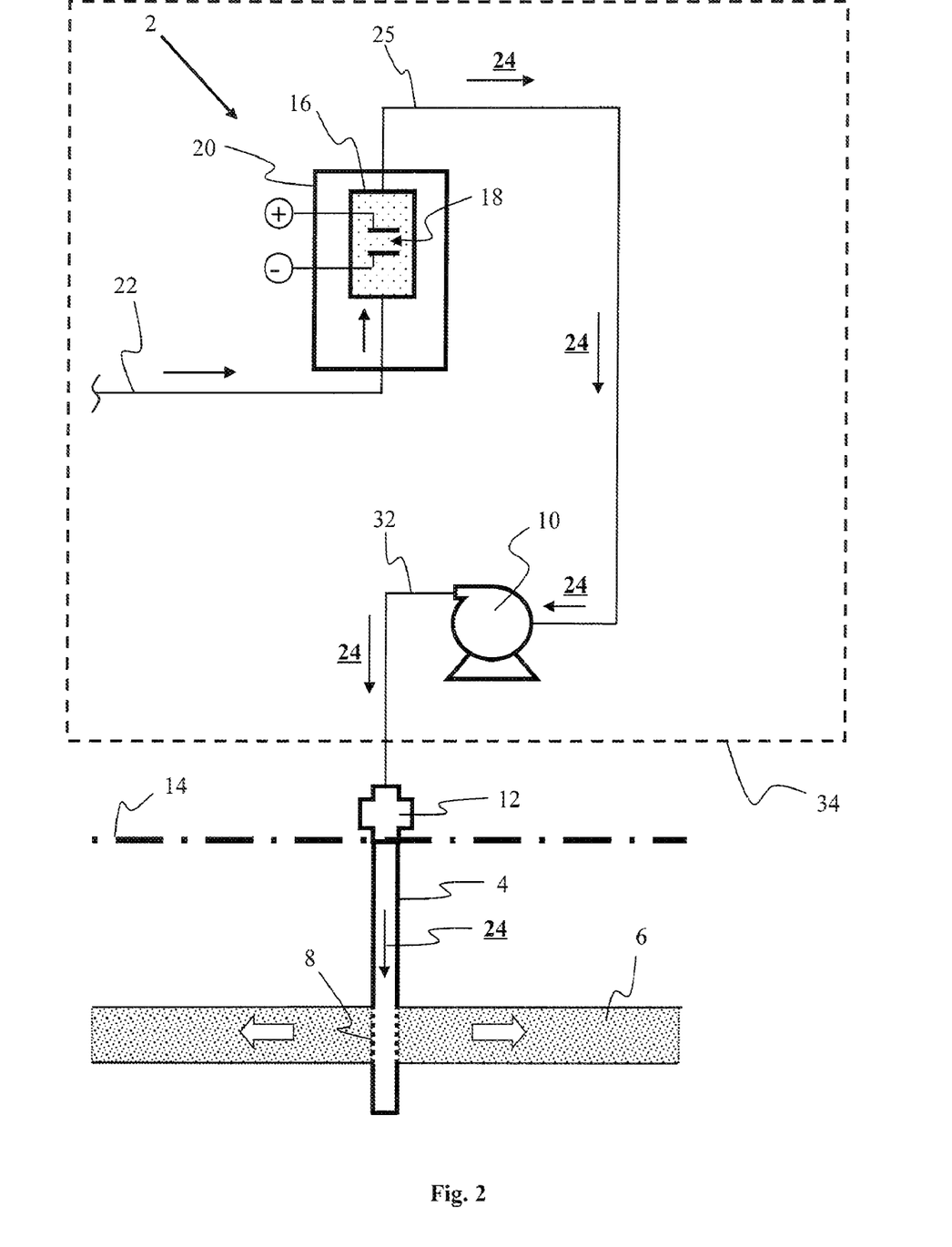
FIG. 2 schematically shows a second example of a device according to the invention, in which the device is shown in its most elementary form.

FIG. 2 shows a second example of an embodiment of a device 2 according to the invention. In this example, the device 2 is shown in its most elementary form, in which the cell 16 and its module 20 are connected to a high-pressure injection pump 10, which pumps treated water 24 down into the injection well 4.

Depending on the particular conditions, the device 2 according to FIG. 1 or 2 may be placed on an installation 34, which is located above water or under water. In this connection, the device 2 is appropriately adapted through the use of technology known to the person skilled in the art.

Figure 3:
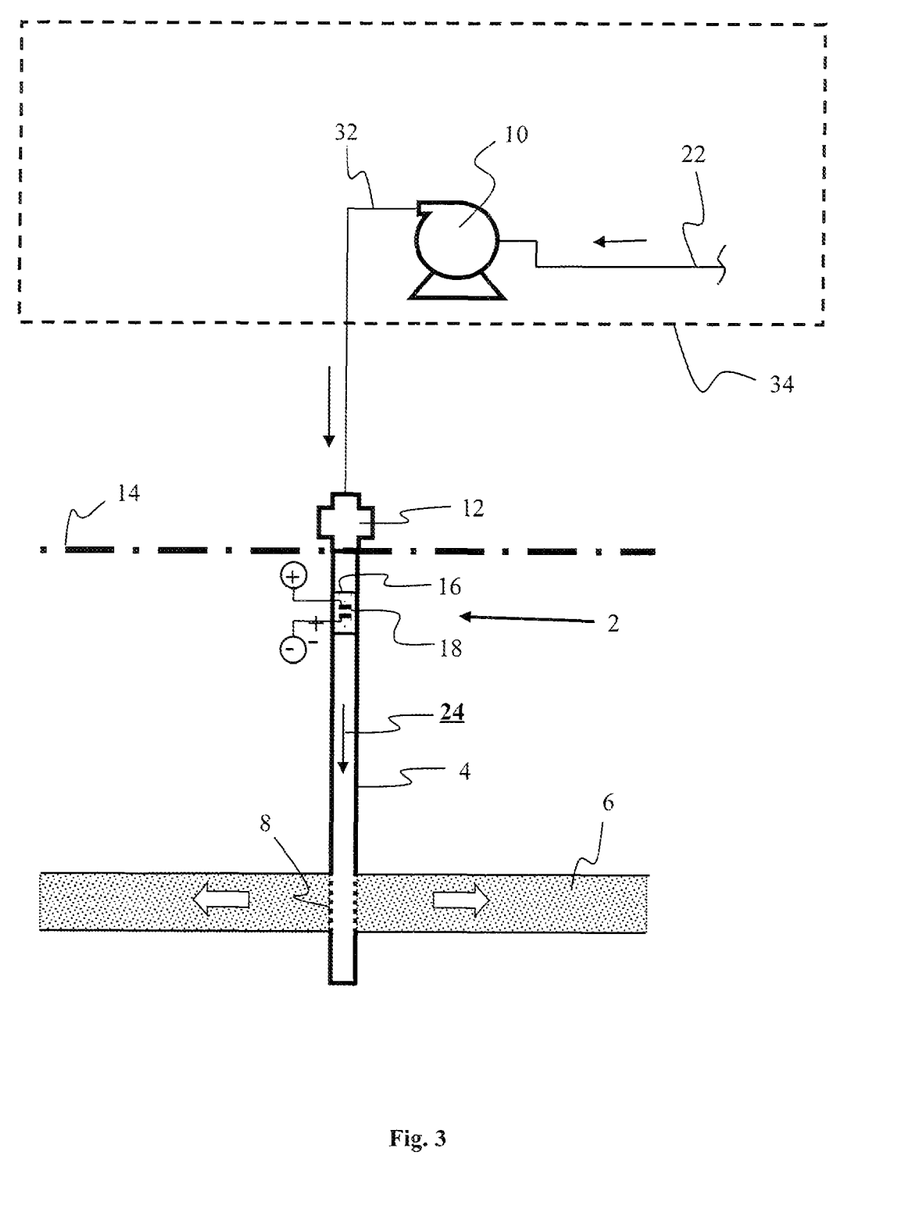
FIG. 3 schematically shows a third example of a device according to the invention, in which the device is shown as a downhole embodiment.

FIG. 3 shows a third example of an embodiment of a device 2 according to the invention. In this figure, said electrochemical cell 16 is provided as downhole equipment within the very injection well 4. A high-pressure injection pump 10 pumps treated water 24 from a suitable installation 34 and down into the injection well 4. Such a solution may prove very interesting in, for example, a seabed-completed injection well operated from a remote host installation 34.

Such injection pumping equipment may also be placed in immediate association with the injection well 4, for example at a seabed, or the injection pumping equipment may be arranged as downhole equipment within the very injection well 4.

By means of the present device 2, it is possible to carry out simple, inexpensive, efficient and environmentally friendly destruction of organic material in water to be conducted into an injection well.

The invention claimed is:

1. A method for destruction of organic material in injection water for an injection well, said method making use of:
   a means for introduction of water in the injection well; and
   at least one electrochemical cell with associated operating means for in situ electrolytic generation, via radiolysis of water, of at least one reactive oxygen compound;
   said method comprising:
   (A) connecting the at least one electrochemical cell to the injection well;
   (B) conducting said injection water, by means of said operating means, through the electrochemical cell for in situ generation of said at least one reactive oxygen compound, thereby using the injection water as a source material for said radiolysis; and
   (C) arranging said electrochemical cell for in situ generation of short-lived, free hydroxyl radicals as at least a primary agent resulting from said radiolysis of the injection water, said hydroxyl radicals being a reactive oxygen compound species that will immediately destruct organic material engaged in the injection water.

2. The method according to claim 1, comprising a step of choosing the injection water from at least one of the following types of water:
   saline water;
   freshwater; and
   produced water from a fluid flow from a production well.

3. The method according to claim 1, comprising a step of arranging the cell, in addition to primary generation of said hydroxyl radicals, for generation of at least one other of the following reactive oxygen compounds:
   ozone;
   hydrogen peroxide;
   hypochlorite; and
   superoxide;
   the compounds of which also will destruct organic material in the injection water.

4. The method according to claim 1, comprising a step of providing said at least one electrochemical cell upstream of the injection well.

5. The method according to claim 1, comprising a step of providing at least one electrochemical cell upstream of a sulphate treatment equipment for removing sulphates from the injection water, whereby bacteria capable of fouling said sulphate treatment equipment are destructed upstream of the sulphate treatment equipment and prior to the water being injected into the well.

6. The method according to claim 1, comprising a step of conducting the injection water to at least one piece of auxiliary equipment for further treatment of the water.

7. The method according to claim 1, comprising a step of providing said at least one electrochemical cell as downhole equipment within the injection well.

8. The method according to claim 7, comprising a step of conducting the injection water to at least one piece of auxiliary equipment for further treatment of the water.

9. A device for destruction of organic material in injection water for an injection well, said device comprising:
   a means for introduction of water into the injection well; and
   at least one electrochemical cell with associated operating means for in situ electrolytic generation, via radiolysis of water, of at least one reactive oxygen compound;
   wherein the at least one electrochemical cell is connected to the injection well;
   wherein the electrochemical cell, by means of said operating means, is arranged in a manner allowing said injection water to be conducted through the cell for in situ generation of said at least one reactive oxygen compound, thereby using the injection water as a source material for said radiolysis; and
   wherein said electrochemical cell is arranged for in situ generation of short-lived, free hydroxyl radicals as at least a primary agent resulting from said radiolysis of the injection water, said hydroxyl radicals being a reactive oxygen compound species that will immediately destruct organic material engaged in the injection water.

10. The device according to claim 9, wherein the injection water comprises at least one of the following types of water:
    saline water;
    freshwater; and
    produced water from a fluid flow from a production well.

11. The device according to claim 9, wherein the cell, in addition to generation of said hydroxyl radicals, also is arranged for generation of at least one other of the following reactive oxygen compounds:
    ozone;
    hydrogen peroxide;
    hypochlorite; and
    superoxide;
    the compounds of which also will be able to destruct organic material in the injection water.

12. The device according to claim 9, wherein said at least one electrochemical cell is provided upstream of the injection well.

13. The device according to claim 9, wherein at least one electrochemical cell is provided upstream of a sulphate treatment equipment for removing sulphates from the injection water, whereby bacteria capable of fouling said sulphate treatment equipment become destructed upstream of the sulphate treatment equipment and prior to water injection in the well.

14. The device according to claim 9, wherein the device comprises a conduit for conducting the injection water to at least one piece of auxiliary equipment for further treatment of the water.

15. The device according to claim 9, wherein said at least one electrochemical cell is provided as downhole equipment within the injection well.

16. The device according to claim 15, wherein the device comprises a conduit for conducting the injection water to at least one piece of auxiliary equipment for further treatment of the water.

17. A method of in situ electrolytic generation of free hydroxyl radicals to treat injection water comprising the steps of:
   injecting untreated injection water in an injection well having at least one electrochemical cell; and
   radiolysing said untreated injection water to generate said free hydroxyl radicals, whereby said generated hydroxyl radicals will immediately destruct organic material engaged in the injection water prior to injection.

* * * * *